(12) United States Patent
Matsuo et al.

(10) Patent No.: US 12,441,594 B2
(45) Date of Patent: Oct. 14, 2025

(54) INFORMATION PROCESSING METHOD, INFORMATION PROCESSING DEVICE, AND PROGRAM

(71) Applicant: MITSUBISHI HEAVY INDUSTRIES, LTD., Tokyo (JP)

(72) Inventors: Minoru Matsuo, Tokyo (JP); Kenji Takao, Tokyo (JP); Atsuyoshi Saimen, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 307 days.

(21) Appl. No.: 18/119,150

(22) Filed: Mar. 8, 2023

(65) Prior Publication Data
US 2023/0294966 A1  Sep. 21, 2023

(30) Foreign Application Priority Data
Mar. 16, 2022 (JP) ................. 2022-041728

(51) Int. Cl.
*B66F 9/06* (2006.01)
*G05D 1/00* (2024.01)

(52) U.S. Cl.
CPC .......... *B66F 9/063* (2013.01); *G05D 1/0214* (2013.01); *G05D 1/0217* (2013.01); *G05D 1/0289* (2013.01)

(58) Field of Classification Search
CPC .... B66F 9/063; G05D 1/0214; G05D 1/0217; G05D 1/0289; G05D 2105/28; G05D 2107/70; G05D 2109/10; G05D 1/644; G06Q 10/08
See application file for complete search history.

(56) References Cited

U.S. PATENT DOCUMENTS 11,650,589 B2 * 5/2023 Takeda ................. G05D 1/0217
                                                  701/25

FOREIGN PATENT DOCUMENTS

| JP | 7-219633 A | 8/1995 |
| JP | 11-143537 A | 5/1999 |
| JP | 3212029 B2 * | 9/2001 |
| JP | 6599139 B2 | 10/2019 |

OTHER PUBLICATIONS

Japanese Office Action for Japanese Application No. 2022-041728, dated Feb. 27, 2024, with English translation.

* cited by examiner

*Primary Examiner* — Anne Marie Antonucci
*Assistant Examiner* — Patrick Daniel Mohl
(74) *Attorney, Agent, or Firm* — Birch, Stewart, Kolasch & Birch, LLP

(57) ABSTRACT

An information processing method includes acquiring information on a first route being a travel route of a first mobile body during a first time period and information on a second route being a travel route of a second mobile body during a second time period after the first time period, and setting a route for standby position as a travel route of the first mobile body during a third time period after the first time period and before the second time period when a target position of the first route is located on the second route. The route for standby position is a route from the target position to a standby position. The standby position is a position not overlapping with the second route.

8 Claims, 12 Drawing Sheets

| PRIORITY INFORMATION | TARGET OBJECT INFORMATION | FIRST POSITION | SECOND POSITION |
|---|---|---|---|
| 0001 | P1 | A1 | A2 |
| 0002 | P11 | A11 | A3 |
| 0003 | P21 | A21 | A4 |
| 0004 | P2 | A31 | A5 |
| 0005 | P21 | A41 | A6 |

FIG. 6

| PRIORITY INFORMATION | TARGET OBJECT INFORMATION | FIRST POSITION | SECOND POSITION | MOBILE BODY | WAYPOINT |
|---|---|---|---|---|---|
| 0001 | P1 | A1 | A2 | 10A | ···,A1,··· |
| 0002 | P11 | A11 | A3 | 10B | ···,A11,··· |
| 0003 | P21 | A21 | A4 | 10C | ···,A21,··· |
| 0004 | P2 | A31 | A5 | 10A | ···,A31,··· |
| 0005 | P21 | A41 | A6 | 10B | ···,A41,··· |

FIG. 7

INFORMATION PROCESSING METHOD, INFORMATION PROCESSING DEVICE, AND PROGRAM

CROSS-REFERENCE TO RELATED APPLICATIONS

This application claims the benefit of priority to Japanese Patent Application Number 2022-041728 filed on Mar. 16, 2022. The entire contents of the above-identified application are hereby incorporated by reference.

TECHNICAL FIELD

The disclosure relates to an information processing method, an information processing device, and a program.

RELATED ART

There is a known technology for setting travel routes for a plurality of mobile bodies that move automatically. For example, JP 6599139 B describes an operation management method in which a basic travel route having the shortest distance from a current position of a loading vehicle to a start position of a work is set, and when the basic travel route interferes with a basic travel route of another loading vehicle, the basic travel route of the loading vehicle having a higher priority is adopted and a detour route is set for the vehicle having a lower priority.

SUMMARY

However, even when routes are set so as not to interfere with each other, there may be a case in which a target position (arrival point) of a route of a mobile body is located on a route of a different mobile body. In that case, a deadlock may occur between these mobile bodies as the different mobile body approaches the target position. Thus, appropriate suppression of the deadlock is desired.

The disclosure has been made to solve the above-described problem, and an object of the disclosure is to provide an information processing method, an information processing device, and a program that can suppress the deadlock.

An information processing method according to the disclosure includes acquiring information on a first route being a travel route of a first mobile body during a first time period and information on a second route being a travel route of a second mobile body during a second time period after the first time period, and setting a route for standby position as a travel route of the first mobile body during a third time period after the first time period and before the second time period when a target position of the first route is located on the second route. The route for standby position is a route from the target position to a standby position. The standby position is a position not overlapping with the second route.

An information processing device according to the disclosure includes a route information acquisition unit that acquires information on a first route being a travel route of a first mobile body during a first time period and information on a second route being a travel route of a second mobile body during a second time period after the first time period, and a work setting unit that sets a route for standby position as a travel route of the first mobile body during a third time period after the first time period and before the second time period when a target position of the first route is located on the second route. The route for standby position is a route from the target position to a standby position. The standby position is a position not overlapping with the second route.

A program according to the disclosure causes a computer to execute acquiring information on a first route being a travel route of a first mobile body during a first time period and information on a second route being a travel route of a second mobile body during a second time period after the first time period, and setting a route for standby position as a travel route of the first mobile body during a third time period after the first time period and before the second time period when a target position of the first route is located on the second route. The route for standby position is a route from the target position to a standby position. The standby position is a position not overlapping with the second route.

According to the disclosure, the reduction in the operating ratio of a mobile body can be suppressed.

BRIEF DESCRIPTION OF DRAWINGS

The disclosure will be described with reference to the accompanying drawings, wherein like numbers reference like elements.

FIG. 6 is a table showing an example of movement destination information.

FIG. 7 is a table for explaining the setting of a work.

DESCRIPTION OF EMBODIMENTS

Hereinafter, preferred embodiments of the disclosure will be described in detail with reference to the accompanying drawings. Note that the disclosure is not limited to these embodiments, and when there are a plurality of embodiments, the disclosure is intended to include a configuration combining these embodiments.

Movement Control System

Figure 1:
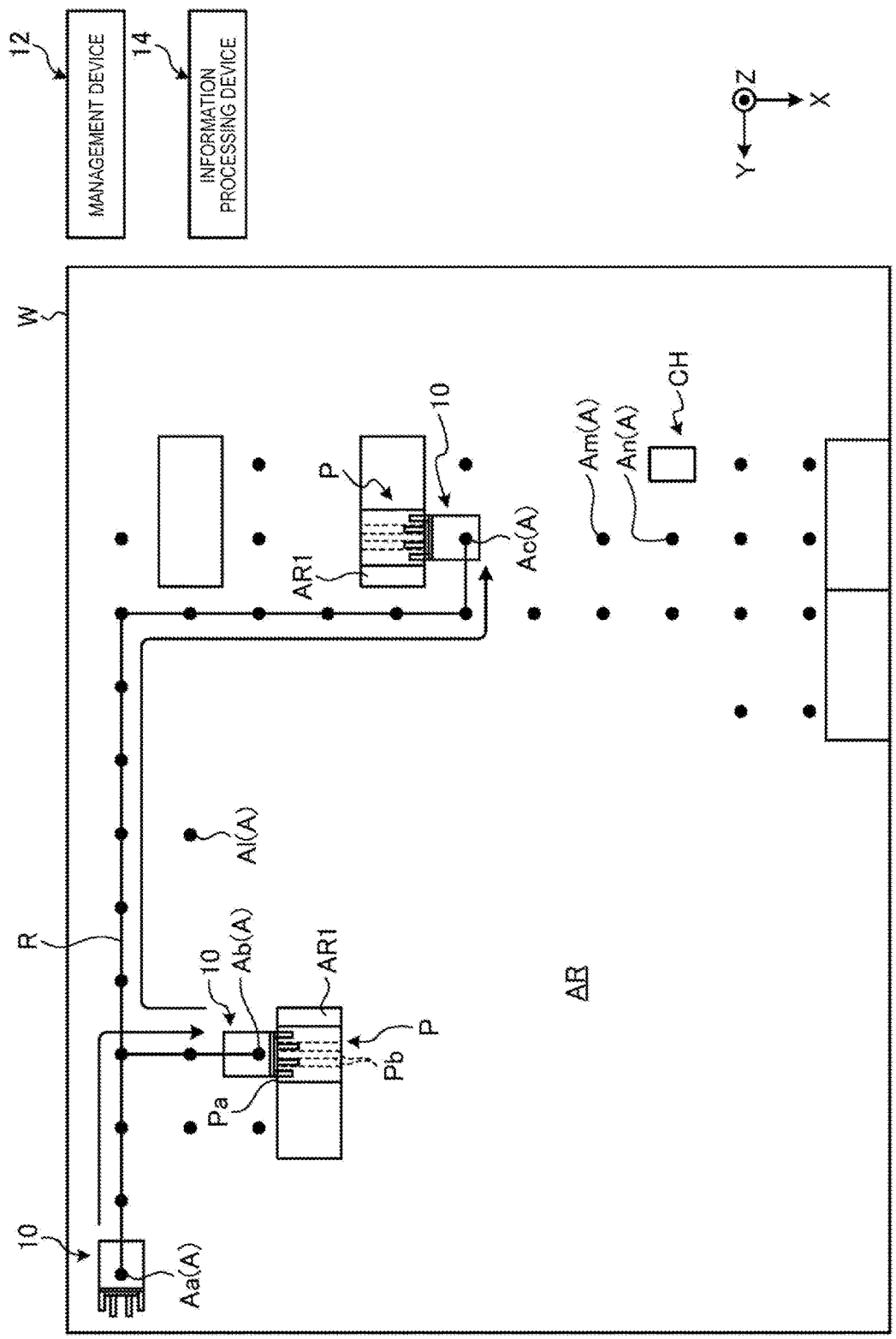
FIG. 1 is a schematic view of a movement control system according to the present embodiment.

FIG. 1 is a schematic view of a movement control system according to the present embodiment. As illustrated in FIG. 1, a movement control system 1 according to the present embodiment includes a mobile body 10, a management device 12, and an information processing device 14. The movement control system 1 is a system that controls the movement of the mobile body 10 belonging to a facility W. The facility W is a facility, such as a warehouse, that is logistically managed. The movement control system 1 causes the mobile body 10 to pick up and convey a target object P disposed within an area AR in the facility W. The area AR is, for example, a floor surface of the facility W, and is an area in which the target object P is placed and through which the mobile body 10 moves. In the present embodiment, the target object P is a conveyance target object composed of a pallet and a burden loaded on the pallet. The target object P includes an opening Pb into which a fork 24 of the mobile body 10 to be described later is inserted, and the opening Pb is formed in a front surface Pa of the target object P. However, the target object P is not limited to an object composed of a pallet and a burden loaded on the pallet, and may be only a burden without a pallet, for example.

Hereinafter, an operation including movement along a route R (to be described later) by the mobile body 10 will be appropriately referred to as a work of the mobile body 10. Further, in the present embodiment, the mobile body 10 moves along the route R to load, convey, and unload the target object P, and thus a series of operations by the mobile body 10 to move along the route R, and load, convey, and unload the target object P can be said to be the work of the mobile body 10. Hereinafter, one direction along the area AR is referred to as an X direction, and a direction along the area AR that is orthogonal to the X direction is referred to as a Y direction. In the present embodiment, the Y direction is a direction orthogonal to the X direction. The X direction and the Y direction may be horizontal directions. A direction orthogonal to the X direction and the Y direction, more specifically, an upward direction in the vertical direction is referred to as a Z direction. In the present embodiment, unless otherwise specified, a "position" refers to a position (coordinates) in a coordinate system in a two dimensional plane on the area AR (the coordinate system of the area AR). Also, unless otherwise specified, an "orientation" of the mobile body 10 or the like refers to an orientation of the mobile body 10 in the coordinate system of the area AR, and means a yaw angle (rotation angle) of the mobile body 10 with the X direction defined as 0 degrees when viewed from the Z direction.

A plurality of placement areas AR1 is disposed in the area AR in the facility W. The placement areas AR1 are configured to be used as areas in which the target object P is placed. The target object P may be placed or may not be placed in each placement area AR1 depending on the situation of the facility W. The position (coordinates), the shape, and the size of the placement area AR1 are determined in advance. In the example illustrated in FIG. 1, the placement areas AR1 are set on a shelf provided in the area AR, but are not limited thereto, and may be provided on the area AR (i.e., on the floor of the facility W), or may be provided in a loading platform of a vehicle that has conveyed the target object P into the facility W. In addition, in the present embodiment, the placement area AR1 is defined for each target object P, and one target object P is placed in each placement area AR1, but the disclosure is not limited thereto. For example, the placement area AR1 may be set as a free space in which a plurality of target objects P are placed. In addition, in the example in FIG. 1, the placement area AR1 has a rectangular shape, but may have any shape and any size, and the number of the placement areas AR1 is also optional.

Waypoint

In the area AR, a waypoint A is set for each position (coordinates). The route R along which the mobile body 10 moves is configured to connect the waypoints A. That is, a route connecting the waypoints A through which the mobile body 10 is scheduled to pass is the route R of the mobile body 10. The waypoints A are set according to the layout of the facility W such as the positions of the placement areas AR1 and passages. For example, the waypoints A are set in a matrix form in the area AR, and the positions and the number of the waypoints A are set such that a route R connecting a position facing one placement area AR1 to a position facing another arbitrary placement area AR1 can be set. The position facing the placement area AR1 may be, for example, a position at which the mobile body 10 can pick up the target object P placed in the placement area AR1. In addition, the waypoints A include a waypoint A configured to be a charging point (in the example of FIG. 1, a waypoint An at which a charger CH is placed) or a waypoint A configured to be a waiting point (in the example of FIG. 1, waypoints Al and Am). The waypoint A that is a charging point or a waiting point may be set at any position that does not overlap with a route (the route used for conveyance) connecting the waypoints A facing the respective placement areas AR1.

Mobile Body

Figure 2:
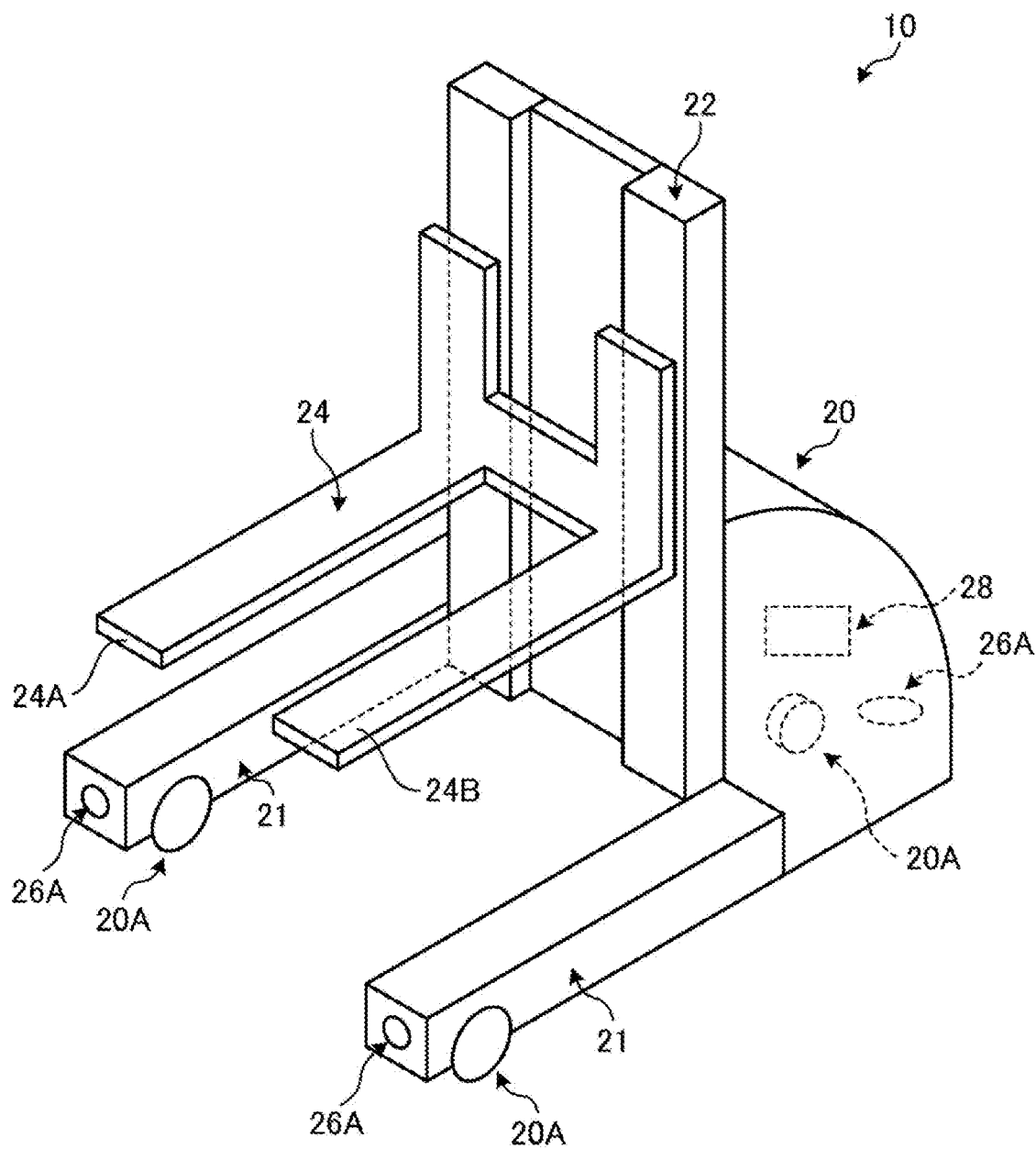
FIG. 2 is a schematic view of a configuration of a mobile body.

FIG. 2 is a schematic view of a configuration of a mobile body. The mobile body 10 is a device that can move automatically and convey the target object P. Further, in the present embodiment, the mobile body 10 is a forklift, and more specifically, a so-called automated guided vehicle (AGV) or a so-called automated guided forklift (AGF). However, the mobile body 10 is not limited to a forklift for conveying the target object P, and may be any device capable of moving automatically.

As illustrated in FIG. 2, the mobile body 10 includes a vehicle body 20, a wheel 20A, a straddle leg 21, a mast 22, a fork 24, a sensor 26A, and a control device 28. The straddle leg 21 is a shaft-like member that is disposed in pairs at one end portion of the vehicle body 20 in a front-back direction and protrudes from the vehicle body 20. The wheel 20A is disposed at a leading end of each of the straddle legs 21 and at the vehicle body 20. That is, a total of three wheels 20A are disposed, but the positions and the number of the wheels 20A disposed may be arbitrary. The mast 22 is movably attached to the straddle legs 21 and moves in the front-back direction of the vehicle body 20. The mast 22 extends along the vertical direction (here, the direction Z) orthogonal to the front-back direction. The fork 24 is attached to the mast 22 so as to be movable in the direction Z. The fork 24 may be movable in a lateral direction of the vehicle body 20 (a direction intersecting with the vertical direction and the front-back direction) with respect to the mast 22. The fork 24 includes a pair of tines 24A and 24B. The tines 24A and 24B extend, from the mast 22, toward the front direction of the vehicle body 20. The tines 24A and 24B are arranged separated from each other in the lateral direction of the mast 22. In the front-back direction, a direction to a side of the mobile body 10 where the fork 24 is disposed and a direction to a side where the fork 24 is not disposed are referred to as a front direction and a back direction, respectively.

The sensors 26A detect at least one of the position and the orientation of a target object present in the periphery of the vehicle body 20. That is, it can be said that the sensor 26A detects at least one of the position of the target object relative to the mobile body 10 and the orientation of the target object relative to the mobile body 10. In the present embodiment, the sensor 26A is disposed at a leading end of each of the straddle legs 21 in the front direction, and at the vehicle body 20 on a back direction side. However, the positions at which the sensors 26A are disposed are not limited thereto, and the sensors 26A may be disposed at any positions, and the number of the sensors 26A disposed may be arbitrary.

The sensor 26A is a sensor that emits a laser beam, for example. The sensor 26A emits the laser beam while performing scanning in one direction (here, the lateral direction), and detects the position and the orientation of the target object based on the reflected light of the laser beam emitted. That is, the sensor 26A is a so-called two-dimensional (2D) light detection and ranging (LiDAR) sensor. Note that the sensor 26A is not limited to the one described above and may be a sensor that detects the target object using any method, such as a so-called three-dimensional (3D)-LiDAR in which scanning is performed in multiple directions, or may be a so-called one dimensional (1D)-LiDAR in which no scanning is performed, or may be a camera.

The control device 28 controls the movement of the mobile body 10. The control device 28 will be described later.

Management Device

Figure 3:
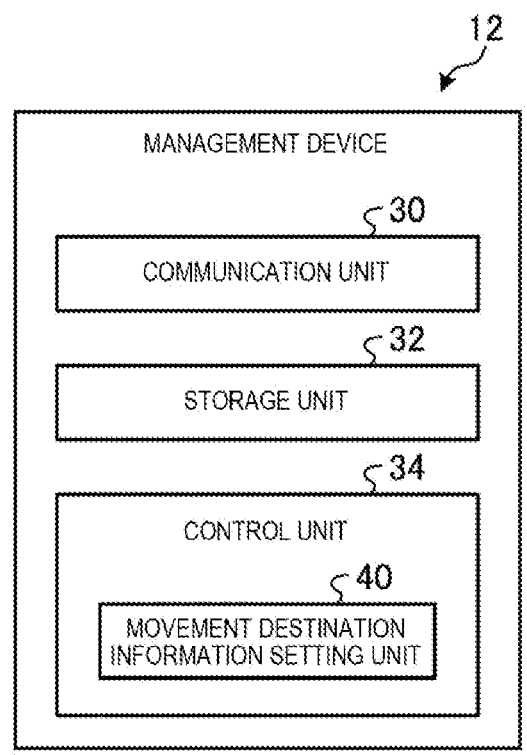
FIG. 3 is a schematic block diagram of a management device.

FIG. 3 is a schematic block diagram of a management device. The management device 12 is a system that manages physical distribution in the facility W. The management device 12 is a warehouse control system (WCS) or a warehouse management system (WMS) in the present embodiment, but is not limited to a WCS and a WMS, and may be any system including a backend system such as any other production management system. The management device 12 may be disposed at any position, and may be disposed in the facility W, or may be disposed at a separate position from the facility W so as to manage the facility W from the separate position. The management device 12 is a computer and includes a communication unit 30, a storage unit 32, and a control unit 34 as illustrated in FIG. 3.

The communication unit 30 is a module used by the control unit 34 to communicate with an external device such as the information processing device 14, and may include, for example, a WiFi (registered trademark) module or an antenna. The communication method of the communication unit 30 is wireless communication in the present embodiment, but any communication method may be used. The storage unit 32 is a memory that stores various information such as computation contents of the control unit 34 and programs, and includes, for example, at least one of a primary storage device such as a random access memory (RAM) or a read only memory (ROM), and an external storage device such as a hard disk drive (HDD).

The control unit 34 is an arithmetic device and includes, for example, an arithmetic circuit such as a central processing unit (CPU). The control unit 34 includes a movement destination information setting unit 40. The control unit 34 reads a program (software) from the storage unit 32 and executes the program to implement the movement destination information setting unit 40 and perform the processing thereof. Note that the control unit 34 may execute such processing with a single CPU, or may include a plurality of CPUs and execute the processing with the plurality of CPUs. The movement destination information setting unit 40 may be implemented by a hardware circuit. The program for the control unit 34 stored in the storage unit 32 may be stored in a recording medium that is readable by the management device 12.

The movement destination information setting unit 40 sets movement destination information indicating a movement destination of the mobile body 10. The processing by the movement destination information setting unit 40 will be more specifically described later.

Note that the management device 12 may execute processing other than the setting of the movement destination information. For example, the management device 12 may also set information for controlling a mechanism other than the mobile body 10 disposed in the facility W (for example, an elevator and a door).

Information Processing Device

Figure 4:
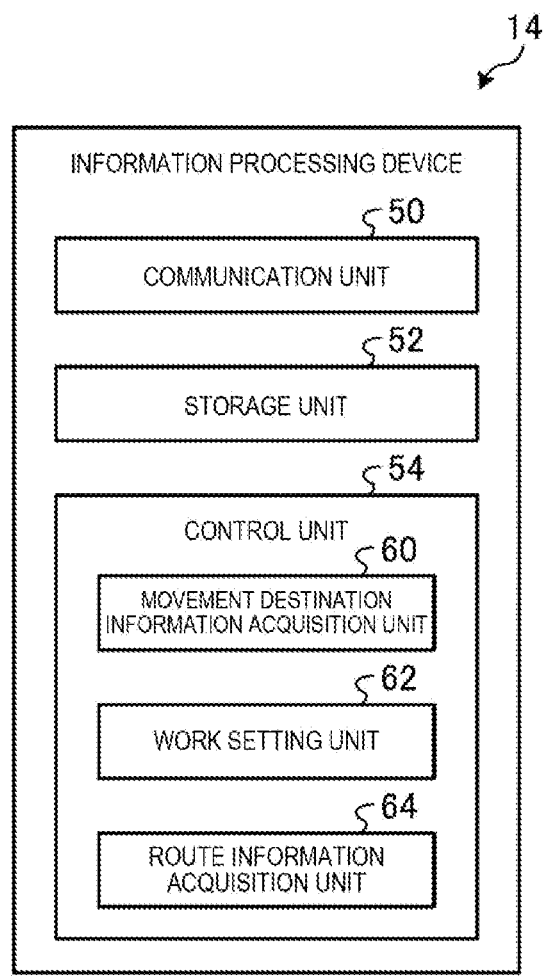
FIG. 4 is a schematic block diagram of an information processing device.

FIG. 4 is a schematic block diagram of the information processing device. The information processing device 14 is a device that is disposed in the facility W and processes information related to the movement of the mobile body 10. The information processing device 14 is, for example, a fleet control system (FCS), but is not limited thereto, and may be any device that processes information related to the movement of the mobile body 10. The information processing device 14 is a computer and includes a communication unit 50, a storage unit 52, and a control unit 54 as illustrated in FIG. 4. The communication unit 50 is a module used by the control unit 54 to communicate with an external device such as the management device 12 and the mobile body 10, and may include, for example, an antenna or a WiFi module. The communication method of the communication unit 50 is wireless communication in the present embodiment, but any communication method may be used. The storage unit 52 is a memory for storing various information such as computation contents of the control unit 54 and programs, and includes, for example, at least one of a primary storage device such as a RAM or a ROM, and an external storage device such as an HDD.

The control unit 54 is an arithmetic device and includes an arithmetic circuit such as a CPU, for example. The control unit 54 includes a movement destination information acquisition unit 60, a work setting unit 62, and a route information acquisition unit 64. The control unit 54 reads programs (software) from the storage unit 52 and executes the programs to implement the movement destination information acquisition unit 60, the work setting unit 62, and the route information acquisition unit 64 and perform the processing thereof. Note that the control unit 54 may execute such processing with a single CPU or may include a plurality of CPUs and execute the processing with the plurality of CPUs. At least a part of the movement destination information acquisition unit 60, the work setting unit 62, and the route information acquisition unit 64 may be implemented by a hardware circuit. The program for the control unit 54 stored in the storage unit 52 may be stored in a recording medium that is readable by the information processing device 14.

The movement destination information acquisition unit 60 acquires the movement destination information, the work setting unit 62 sets the routes R of the mobile bodies 10, and the route information acquisition unit 64 acquires information on the route R of each mobile body 10. Specific contents of the above-described processing will be described below.

Note that, in the present embodiment, the management device 12 and the information processing device 14 are separate devices, but may be an integrated device. That is, the management device 12 may have at least a part of the function of the information processing device 14, and the information processing device 14 may have at least a part of the function of the management device 12.

Control Device for Mobile Body

Figure 5:
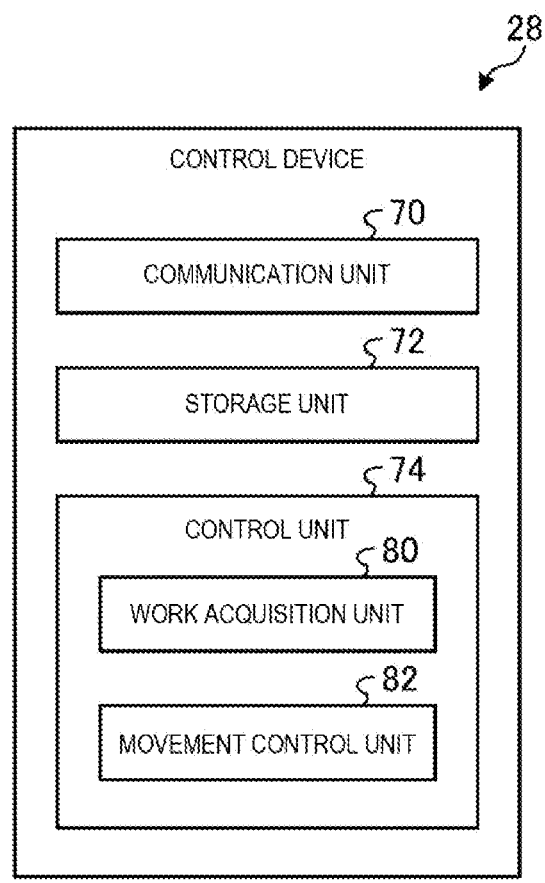
FIG. 5 is a schematic block diagram of a control device for the mobile body.

Next, the control device 28 for the mobile body 10 will be described. FIG. 5 is a schematic block diagram of a control device for the mobile body. The control device 28 is a device for controlling the mobile body 10. The control device 28 is a computer and includes a communication unit 70, a storage unit 72, and a control unit 74 as illustrated in FIG. 5. The communication unit 70 is a module used by the control unit 74 to communicate with an external device such as the information processing device 14, and may include, for example, an antenna or a WiFi module. The communication method of the communication unit 70 is wireless communication in the present embodiment, but any communication method may be used. The storage unit 72 is a memory for storing various information such as computation contents of the control unit 74 and programs, and includes, for example, at least one of a primary storage device such as a RAM or a ROM, and an external storage device such as an HDD.

The control unit 74 is an arithmetic device and includes an arithmetic circuit such as a CPU, for example. The control unit 74 includes a work acquisition unit 80, a movement control unit 82, and an obstacle detection unit 84. The control unit 74 reads a program (software) from the storage unit 72 and executes the program to implement the work acquisition unit 80, the movement control unit 82, and the obstacle detection unit 84 and perform the processing thereof. Note that the control unit 74 may execute such processing with a single CPU or may include a plurality of CPUs and execute the processing with the plurality of CPUs. At least a part of the work acquisition unit 80, the movement control unit 82, and the obstacle detection unit 84 may be implemented by a hardware circuit. In addition, the program for the control unit 74 stored in the storage unit 72 may be stored in a recording medium that is readable by the control device 28.

The work acquisition unit 80 acquires information indicating the route R of the mobile body 10, the movement control unit 82 controls a movement mechanism such as a drive unit or a steering device of the mobile body 10 so as to control the movement of the mobile body 10. Specific contents of the above-described processing will be described below.

Processing of Movement Control System

Next, the processing contents of the movement control system 1 will be described.

Setting of Movement Destination Information

The movement destination information setting unit 40 of the management device 12 sets movement destination information indicating a movement destination of the mobile body 10. The movement destination information includes information indicating the position of the movement destination of the mobile body 10. More specifically, in the present embodiment, the movement destination information setting unit 40 sets the movement destination information so as to include first position information (position information of a first position) and second position information (position information of a second position). The first position is a position which the mobile body 10 reaches first, and the second position is a position which the mobile body 10 reaches next to the first position. That is, in the example of the present embodiment, the first position is the position of a conveyance source of the target object P, and the second position is the position of a conveyance destination of the target object P. The movement destination information setting unit 40 may directly specify the position (coordinates) of the first position as the first position information. In addition, an identifier may be assigned to each waypoint A, and the movement destination information setting unit 40 may specify the identifier of a waypoint A corresponding to the first position as the first position information. The same applies to the second position information.

FIG. 6 is a table showing an example of movement destination information. In the present embodiment, the movement destination information setting unit 40 sets the movement destination information for each target object P to be conveyed, in other words, for each work. That is, the movement destination information setting unit 40 associates target object information indicating a target object P to be conveyed, the first position information that is the conveyance source of the target object P, and the second position information indicating the conveyance destination of the target object P with each other so as to set the movement destination information for each target object P. Note that, for example, an identifier may be assigned to each target object P, and information indicating the identifier may be used as the target object information. Further, as illustrated in FIG. 6, in the present embodiment, it is preferable for the movement destination information setting unit 40 to associate the target object information, the first position information, the second position information, and priority information with each other so as to set the movement destination information for each target object P. The priority information is information indicating a priority order for conveying a target object P among a group of movement destination information for each target object P. That is, for example, a target object P having the highest priority in the priority information is to be conveyed first. FIG. 6 shows an example in which pieces of movement destination information are set as follows: movement destination information in which the priority is 0001 (first), the target object is P1, the first position is A1, and the second position is A2; movement destination information in which the priority is 0002 (second), the target object is P11, the first position is A11, and the second position is A3; movement destination information in which the priority is 0003 (third), the target object is P21, the first position is A21, and the second position is A4; movement destination information in which the priority is 0004 (fourth), the target object is P2, the first position is A31, and the second position is A5; and movement destination information in which the priority is 0005 (fifth), the target object is P21, the first position is A41, and the second position is A6. However, FIG. 6 is only an example, and the movement destination information may be arbitrarily set in accordance with an order status or the like.

In addition, the movement destination information setting unit 40 may set the movement destination information so as to include designation information for designating a mobile body 10 to move from the first position to the second position (a mobile body 10 to perform the work). That is, in the example of the present embodiment, the movement destination information setting unit 40 may associate the target object information, the first position information, the second position information, the priority information, and the designation information with each other so as to set the movement destination information for each target object P. In that case, for example, an identifier may be assigned to each mobile body 10, and information indicating the identifier may be used as the designation information.

The movement destination information setting unit 40 may set the movement destination information in any method. For example, the movement destination information setting unit 40 may acquire an order information indicating a target object P to be conveyed, a conveyance source, and a conveyance destination, and set the movement destination information based on the order information. The movement destination information setting unit 40 transmits the set movement destination information to the information processing device 14 via the communication unit 30.

Acquisition of Movement Destination Information

The movement destination information acquisition unit 60 of the information processing device 14 acquires the movement destination information from the management device 12 via the communication unit 50.

Setting of Work

The work setting unit 62 of the information processing device 14 sets a work of the mobile body 10 based on the movement destination information. The work setting unit 62 sets the route R of the mobile body 10 to the movement destination as the work of the mobile body 10. In the present embodiment, the work setting unit 62 sets, as the route R of the mobile body 10, a first route to the first position (conveyance source) indicated by the first position information from an initial position at which the mobile body 10 is located immediately before starting to move to the first position, and a second route to the second position (conveyance destination) indicated by the second position information from the first position. That is, the work setting unit 62 sets the route R of the mobile body 10 such that respective waypoints A from the initial position to the first position are set as the first route, and respective waypoints A from the first position to the second position are set as the second route. In the example of FIG. 1, the movement destination information indicates that the first position is a waypoint Ab and the second position is a waypoint Ac, and the work setting unit 62 sets, as the route R of the mobile body 10, the first route passing through respective waypoints A from the waypoint Aa, which is the initial position of the mobile body 10 selected, to the waypoint Ab, and the second route passing through respective waypoints A from the waypoint Ab to the waypoint Ac.

FIG. 7 is a table for explaining the setting of the work. When a plurality of mobile bodies 10 are deployed in the facility W, the work setting unit 62 selects a mobile body 10 that conveys a target object P as the work of the mobile body 10. Also, when the movement destination information is set for a plurality of target objects P, the work setting unit 62 sets the route R of a mobile body 10 for each target object P. That is, the work setting unit 62 selects, for each target object P, a mobile body 10 that conveys the target object P, and sets the route of the selected mobile body 10. In the example of FIG. 7, the work setting unit 62 selects a mobile body 10A as the mobile body 10 that conveys a target object P1 indicated by the movement destination information, and sets a route from the initial position of the mobile body 10A, through A1 as the first position, to A2 as the second position ( . . . waypoint A1 . . . ). Descriptions of mobile bodies selected for other target objects P illustrated in FIG. 7 and the routes (waypoints) thereof are the same as those above, and thus are omitted. Note that the work setting unit 62 may select a mobile body 10 in any manner, and may select a mobile body 10 for each target object P such that the time until the completion of the conveyance of all the target objects P is the shortest, for example. In the case where a target mobile body 10 has been designated as the designation information in the movement destination information, it is only necessary to select the mobile body 10 designated in the designation information.

The work setting unit 62 also sets a reserved time period during which the selected mobile body 10 passes through the route R (waypoints A) as the work of the mobile body 10. In this case, other mobile bodies 10 are prohibited from passing through the route R during the reserved time period. That is, the selected mobile body 10 occupies the set route R during the reserved time period. In setting the route R for each of a plurality of target objects P, the work setting unit 62 sets a mobile body 10, a route R (waypoints A), and a reserved time period for each target object P such that, in the reserved time period of one mobile body 10, the same waypoints A as those for the one mobile body 10 are not set for other mobile bodies (such that there is no overlapping of reserved time periods) and such that no deadlock occurs even when there is no overlapping of reserved time periods. Further, the work setting unit 62 may set a route R and a reserved time period also based on the priority information in the movement destination information. That is, the work setting unit 62 sets a mobile body 10, a route R, and a reserved time period for each target object P such that there is no overlapping of reserved time periods and that the conveyance of a target object P having a higher priority is completed sooner. Note that the route R includes a plurality of waypoints A, and thus the work setting unit 62 may set a reserved time period for each waypoint A included in the route R.

Note that the deadlock refers to a phenomenon in which each of a plurality of running programs or the like mutually waits for a result of other programs, and remains in a standby state and does not operate. In the present embodiment, the deadlock may refer to a phenomenon in which the mobile bodies 10 remain stopped if there is a possibility that the mobile bodies 10 will collide with each other when the mobile bodies 10 keep moving along the current routes, and if it is impossible to set avoidance routes toward travel direction sides.

Further, the work setting unit 62 sets a route for standby position for the mobile body 10 that has completed a work to move to a standby position. Setting of a route for standby position will be described in detail later.

The work setting unit 62 transmits information on the set work to the mobile body 10 to which the set work is assigned. In the example of FIG. 7, the work setting unit 62 transmits information on the work for the target object P1 and information on the work for the target object P2 to the mobile body 10A. The work setting unit 62 transmits information on the route R as the information on the work. The work setting unit 62 transmits information indicating respective waypoints A through which the route R passes as the information on the route R. For example, the work setting unit 62 may transmit position (coordinate) information of respective waypoints A through which the route R passes to the mobile body 10 as the information on the route R, or may transmit information indicating the identifiers of respective waypoints A through which the route R passes to the mobile body 10 as the information on the route R. Further, in the present embodiment, the work setting unit 62 also transmits information on the reserved time period, that is, information indicating the reserved time period during which the mobile body 10 passes through the route (waypoints A) to the mobile body 10 as the information on the work.

Movement of Mobile Body

The work acquisition unit 80 of a mobile body 10 acquires information on the route R set for the mobile body 10 from the information processing device 14. The movement control unit 82 of the mobile body 10 moves the mobile body 10 along the route R acquired. In the present embodiment, the work acquisition unit 80 also acquires information on the reserved time period together with the information on the route R. The movement control unit 82 causes the mobile body 10 to pass through each waypoint A through which the route R passes during the reserved time period set for each waypoint A. The mobile body 10 moves so as to pass through each waypoint A on the route R by sequentially grasping the position information of the mobile body 10 through the movement control unit 82. The method of acquiring the position information of the mobile body 10 through the movement control unit 82 is arbitrary. In the present embodiment, for example, a detection body (not illustrated) is disposed in the facility W, and the movement control unit 82 acquires the information on the position and the orientation of the mobile body 10 based on the detection of the detection body. Specifically, the mobile body 10 irradiates the detection body with a laser beam, receives light of the laser beam reflected from the detection body, and detects the position and the orientation of the mobile body 10 in the facility W. The method of acquiring the information on the position and the orientation of the mobile body 10 is not limited to using a detection body, and simultaneous localization and mapping (SLAM) may be used, for example.

In the example of FIG. 1, the movement control unit 82 causes the mobile body 10 to move from the waypoint Aa, which is the initial position, to the waypoint Ab, which is the first position, so as to pass through each waypoint A from the waypoint Aa to the waypoint Ab. When the mobile body 10 reaches the waypoint Ab, the movement control unit 82 controls the fork 24 to insert the fork 24 into the opening Pb of the target object P placed in the placement area AR1 facing the waypoint Ab so as to pick up (load) the target object P. In this case, the movement control unit 82 may cause the sensor 26A to detect the position and the orientation of the target object P at the waypoint Ab or at any position before reaching the waypoint Ab. Then, the movement control unit 82 may set an approach route to the target object P based on the position and the orientation of the target object P, and approach the target object P along the approach route to pick up the target object P. That is, in that case, the movement control unit 82 may set a new approach route that allows a predetermined position and a predetermined orientation with respect to the position and the orientation of the target object P detected (the position and the orientation at which the mobile body 10 can pick up the target object P), and approach the target object P along the approach route. Alternatively, for example, the movement control unit 82 may cause the mobile body 10 to approach the target object P by performing feedback control (direct feedback control) based on the detection result of the position and the orientation of the target object P and the detection result of the position and the orientation of the mobile body 10. In that case, switching to the direct feedback control may be performed during the approach along a route based on the position and the orientation of the target object P.

After the mobile body 10 picks up the target object P, the movement control unit 82 causes the mobile body 10 to return to the waypoint Ab and then move to the waypoint Ac, which is the second position, so as to pass through each waypoint A from the waypoint Ab to the waypoint Ac. When the mobile body 10 reaches the waypoint Ac, the movement control unit 82 controls the fork 24 to drop (unload) the target object P in the placement area AR1 facing the waypoint Ac.

After the mobile body 10 drops the target object P, the movement control unit 82 causes the mobile body 10 to return to the waypoint Ac. When a next route R in which the waypoint Ac is the initial position has already been set, the movement control unit 82 causes the mobile body 10 to move along that route R.

Route for Standby Position

Here, there may be a case in which a target position (second position) of a route R of a mobile body 10 is located on a route R of a different mobile body 10 scheduled to move later. In that case, when the mobile body 10 that has completed the movement to a target position remains at the target position until the start of a next work, the different mobile body 10 may approach the target position, causing a deadlock between these mobile bodies 10. That is, there is a possibility that the different mobile body 10 cannot generate a route to avoid the mobile body 10 located at the target position and a deadlock occurs between these mobile bodies 10. In contrast, in the present embodiment, before the different mobile body 10 approaches the mobile body 10 that has reached the target position, a route (route for standby position) to a standby position that does not overlap with the route R of the different mobile body 10 is set, and the mobile body 10 is caused to move to the standby position. Accordingly, the deadlock can be suppressed. The setting of a route for standby position will be described in detail below.

Acquisition of Information on Route

Considering a mobile body 10 for which a route for standby position is set as a first mobile body, the route information acquisition unit 64 of the information processing device 14 acquires information on the route R of the first mobile body (first route). In addition, the route information acquisition unit 64 acquires information on the route R (second route) of a second mobile body other than the first mobile body during a time period (second time period) after a reserved time period (first time period) for the route R of the first mobile body. In the present embodiment, the route information acquisition unit 64 acquires the information on a route R for each work set by the work setting unit 62. Note that the routes R of the mobile bodies 10 (each waypoint A to pass through) are set in advance by the work setting unit 62, it can be said that the route information acquisition unit 64 reads out the information on each of the routes R that have been set.

Determining Whether to Set Route for Standby Position

The work setting unit 62 determines whether the target position (in the present embodiment, the second position) of the first route of the first mobile body is located on the second route of the second mobile body set for a reserved time period after the reserved time period of the first route. That is, the work setting unit 62 determines whether there is a route R overlapping with the target position of the first route among routes R of mobile bodies other than the first mobile body set for reserved time periods after the reserved time period of the first route. Here, the target position of the first route being located on the second route means that any of the waypoints A of the second route is the waypoint A of the target position of the first route. However, the disclosure is not limited thereto, and the target position of the first route may be determined to be located on the second route if any of the waypoints A of the second route is the waypoint A of the target position of the first route and if it is impossible to set an avoidance route that leads to the target position of the second route while avoiding the first mobile body located on the target position of the first route. That is, even when the waypoint A of the target position of the first position is located on the second route, if it is possible to set the avoidance route, it may be determined that the target position of the first route is not located on the second route.

When the target position of the first route is located on the second route of the second mobile body set for a time period after the reserved time period of the first route, the work setting unit 62 determines that the setting of a route for standby position for the first mobile body is necessary. On the other hand, when the target position of the first route is not located on the second route of the second mobile body, the work setting unit 62 determines that the setting of a route for standby position for the first mobile body is not necessary. That is, the work setting unit 62 determines that the setting of a route for standby position for the first mobile body is necessary if there is a route R overlapping with the target position of the first route among routes R of mobile bodies other than the first mobile body set for time periods after the first time period, or determines that the setting of a route for standby position for the first mobile body is not necessary if there is no route R overlapping with the target position of the first route among the routes R. In other words, when the target position of the first route is located on the second route, it is determined that a route for standby position necessary because the first mobile body located at the target position may cause a deadlock with the second mobile body moving on the second route. On the other hand, when the target position of the first route is not located on the second route, it is determined that a route for standby position is unnecessary because no deadlock will occur even if the first mobile body is located at the target position.

However, even when there is a second route overlapping with the target position of the first route, if a next work (route R) whose target position (second position) does not overlap with the second route has been set for the first mobile body for a reserved time period before a reserved time period of the second route, the work setting unit 62 may determine that the setting of a route for standby position for the first mobile body is not necessary. That is, in this case, the first mobile body moves to another position because of the next work before the second mobile body passes through the target position of the first route, and thus it may be determined that no route for standby position is necessary.

In addition, when the target position of the first route is not located on the second route of the second mobile body, the work setting unit 62 determines not to set a route for standby position, but is not limited thereto, and may determine to set a route for standby position even in this case.

Setting of Route for Standby Position

When the work setting unit 62 determines to set a route for standby position, that is, in the present embodiment, when the target position of the first route is located on the second route of the second mobile body, the work setting unit 62 sets a route for standby position from the target position of the first route to a standby position for the first mobile body. The standby position is a position that does not overlap with the second route, and will be described in detail later. The work setting unit 62 sets the route for standby position as a route R of the first mobile body in a reserved time period (third time period) after the first time period and before the reserved time period of the second route (second time period).

In the present embodiment, it is determined whether the setting of a route for standby position is necessary for each work set by the work setting unit 62, and a route for standby position is set for each work determined to be necessary. That is, the work setting unit 62 determines for each work whether a target position of a route R of a mobile body 10 is located on routes R of other mobile bodies set for reserved time periods after the reserved time period of the route R. Then, for each work whose target position is determined to be located on a route R of another mobile body, the work setting unit 62 sets a route for standby position from a target position of a route R of such a work to a standby position.

In the present embodiment, the work setting unit 62 transmits to the mobile body 10 information on the route for standby position together with information on a route R for a conveyance work as the information on the work. For example, in FIG. 7, only the information on routes R for conveyance works is included as the information on the work, but when a route for standby position is set, it can be said that the information on the route for standby position is also included in the information on the work. That is, in the present embodiment, it can be said that a route for standby position is set during route R planning and is set in advance before the mobile body 10 starts a conveyance work.

Figure 8:
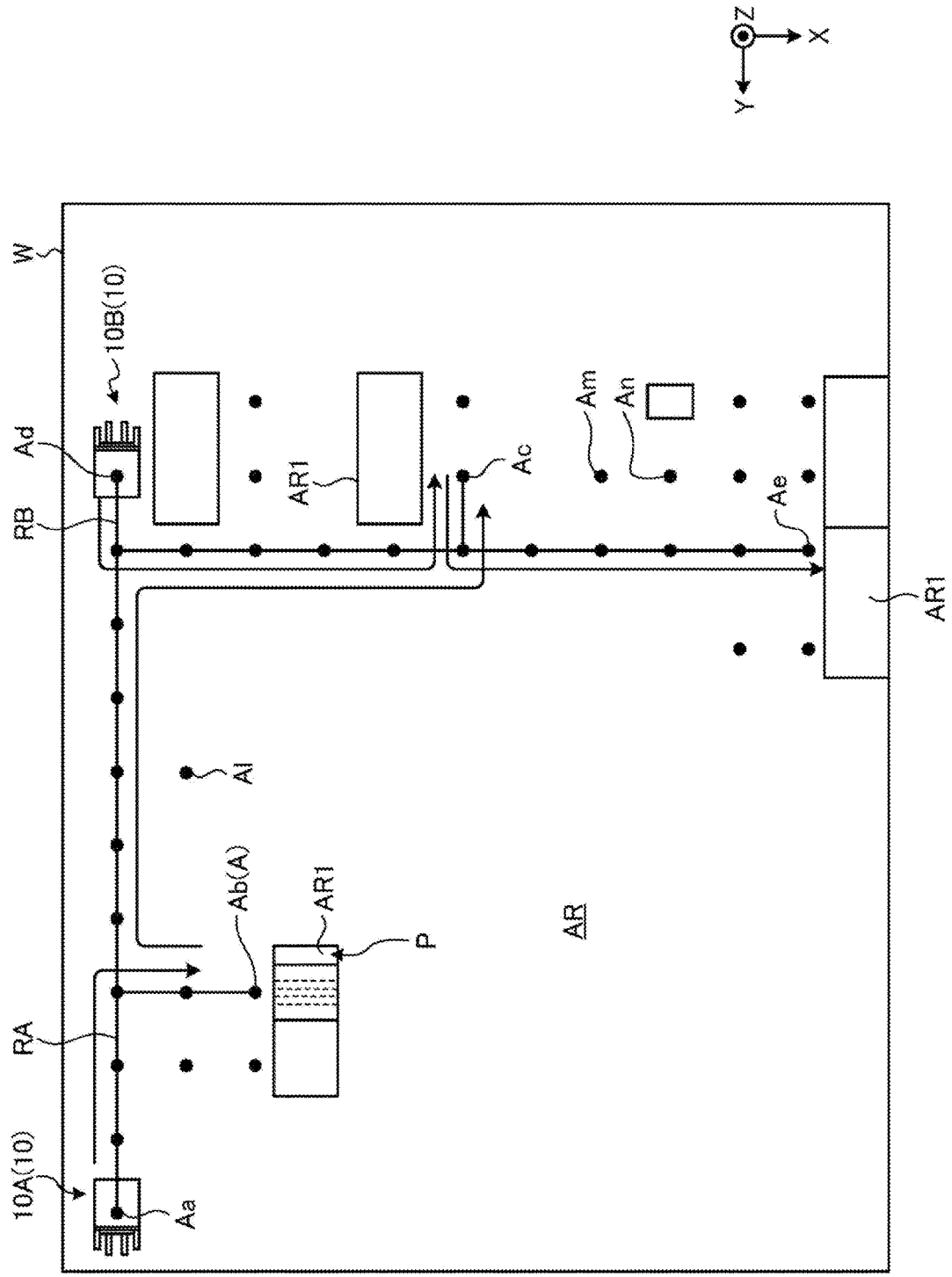
FIG. 8 is a schematic view illustrating an example of a route for standby position.
Figure 9:
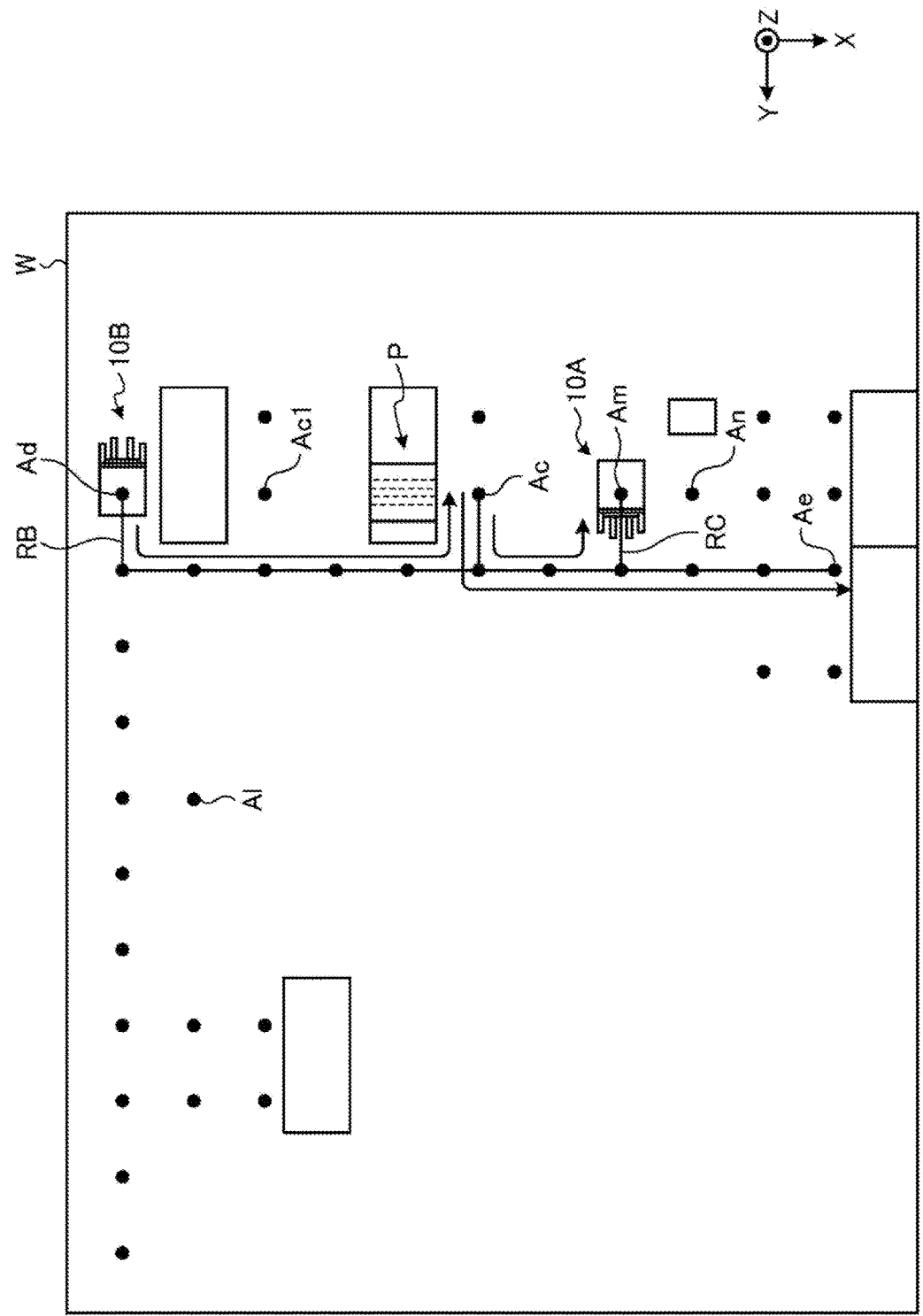
FIG. 9 is a schematic view illustrating an example of a route for standby position.

An example of a route for standby position will be described below with reference to FIGS. 8 and 9. Each of FIGS. 8 and 9 is a schematic view illustrating an example of a route for standby position. In FIG. 8, a route RA from a waypoint Aa (initial position) through a waypoint Ab (first position) to a waypoint Ac (second position, i.e., target position) is set as a route (first route) of a mobile body 10A (first mobile body) for a first time period. Also, in FIG. 8, a route RB from a waypoint Ad (initial position) through the waypoint Ac (first position) to a waypoint Ae (second position, i.e., target position) is set as a route (second route) of a mobile body 10B (second mobile body) for a second time period after the first time period. In this case, the waypoint Ac, which is the target position of the route RA, is located on the route RB. Thus, as illustrated in FIG. 9, the work setting unit 62 sets a route for standby position RC from the waypoint Ac to a waypoint Am (standby position) that does not overlap with the route RB as a route of the mobile body 10A for a third time period after the first time period and before the second time period. Accordingly, the mobile body 10A moves from the waypoint Aa to the waypoint Ab and picks up a target object P, and then moves to the waypoint Ac and drops the target object P. Subsequently, the mobile body 10A moves from the waypoint Ac to the waypoint Am. Then, the mobile body 10B moves from the waypoint Ad to the waypoint Ac and picks up the target object P, and then moves to the waypoint Ae and drops the target object P. By setting the route for standby position in this manner, a deadlock between the mobile body 10A and the mobile body 10B can be suppressed.

Note that, in the examples of FIGS. 8 and 9, the first position of the mobile body 10B overlaps with the target position (second position) of the mobile body 10A. However, the disclosure is not limited thereto, and the route for standby position RC of the mobile body 10A may be set when the target position of the mobile body 10A overlaps with an arbitrary position on the route RB of the mobile body 10B.

Standby Position

The work setting unit 62 may set, as a standby position, an arbitrary position that does not overlap with the second route, that is, an arbitrary position that is not located on the second route. For example, a plurality of candidate positions that do not overlap with the second route may be set, and the work setting unit 62 may set, as a standby position, a position selected from among the plurality of candidate positions. Each of the candidate positions in this case may be any position that does not overlap with a route connecting waypoints A facing placement areas AR1 (a route used for conveyance). That is, in the example of FIG. 9, the waypoints Am, An, and Al that do not overlap with the route used for conveyance are set as the candidate positions. However, the candidate positions only need to be positions that do not overlap with the second route, and, for example, waypoints A that overlap with the route used for conveyance but do not overlap with the second route, such as a waypoint Ac1, may be set as the candidate positions. In that case, preferably, waypoints A that are not set as first positions or second positions of other works (routes R), that is, waypoints A that are not designated as conveyance sources or conveyance destinations of target objects P are set as the candidate positions. An example of setting a standby position will be described below.

Example of Setting Standby Position

The work setting unit 62 may select a standby position from among the plurality of candidate positions based on a distance between the target position of the first route and each of the candidate positions. That is, the work setting unit 62 may calculate a distance between the target position of the first route and each of the candidate positions, and set a standby position based on the distance for each candidate position. For example, the work setting unit 62 may set, as a standby position, a candidate position having the shortest distance from the target position of the first route. For example, in FIG. 9, waypoints Am, An, and Al are set as the candidate positions. In this case, because the waypoint Am has the shortest distance from the waypoint Ac, which is the target position, among the waypoints Am, An, and Al, the waypoint Am is selected as the standby position, and the route for standby position RC from the waypoint Ac to the waypoint Am is set. By setting the position having the shortest distance as the standby position in this manner, it is possible to cause the mobile body 10A to quickly move to the standby position, and reduce energy consumption for moving to the standby position.

Alternatively, the work setting unit 62 may select a standby position from among the plurality of candidate positions based on expected arrival times from the target position of the first route to the candidate positions. That is, the work setting unit 62 may calculate an expected arrival time from the target position of the first route to each of the candidate positions, and set a candidate position having the shortest expected arrival time as the standby position. Here, the expected arrival time can be calculated based on a distance from the target position to each of the candidate positions, and the shorter the distance is, the shorter the expected arrival time is. However, in a case of moving from the target position to a candidate position in between movements of other mobile bodies 10, a standby time for waiting until the other mobile body 10 pass by is set so as not to cause interference with the movements of the other mobile bodies 10. Thus, even when the distance is short, if the standby time is long, the expected arrival time is also long. Accordingly, in a case of moving from the target position to a candidate position in between movements of other mobile bodies 10, the work setting unit 62 sets a route for standby position while setting a standby time so that the first mobile body will not pass through sections through which mobile bodies 10 other than the first mobile body are scheduled to pass after the first time period at the same time period as the other mobile bodies 10. The work setting unit 62 calculates the expected arrival times based on the distances from the target position to the candidate positions and the standby times, and sets a candidate position having the shortest expected arrival time as the standby position. This makes it possible to cause the mobile body 10A to move to the standby position as quickly as possible without causing interference with the movements of the other mobile bodies 10.

In addition, for example, the work setting unit 62 may determine whether to set a standby position based on the distances between the target position of the first route and the candidate positions or to set a standby position based on the expected arrival times on the basis of a time difference between the reserved time period (first time period) of the first route and the reserved time period (second time period) of the second route. For example, when the time difference between the first time period and the second time period is less than a predetermined amount of time, the work setting unit 62 may set a candidate position having the shortest distance as a standby position based on the distances between the target position of the first route and the candidate positions. In that case, preferably, the work setting unit 62 does not set a standby time to the first mobile body so as to cause the first mobile body to preferentially move to the standby position instead of causing the first mobile body to move in between movements of the other mobile bodies 10. That is, when the time difference between the first time period and the second time period is short, it is determined that the first mobile body has an immediate need for evacuation, and accordingly it is possible to move the first mobile body to the standby position that is the shortest distance while prioritizing movement of the first mobile body to the standby position. In this case, when a route of a different mobile body 10 is set in the same time period in a section overlapping with the route for standby position of the first mobile body, a standby time is set to the different mobile body 10 so as to keep the different mobile body 10 waiting.

On the other hand, when the time difference between the first time period and the second time period is equal to or greater than a predetermined amount of time, the work setting unit 62 may set a candidate position having the shortest expected arrival time as a standby position based on the expected arrival times from the target position of the first route to the candidate positions. In that case, the work setting unit 62 sets a standby time to the first mobile body so as to cause the first mobile body to move in between movements of the other mobile bodies 10. That is, when the time difference between the first time period and the second time period is long, it is determined that the first mobile body has no immediate need for evacuation, and accordingly the first mobile body can move so as to reach the standby position as quickly as possible without interfering the other mobile bodies 10.

Figure 10:
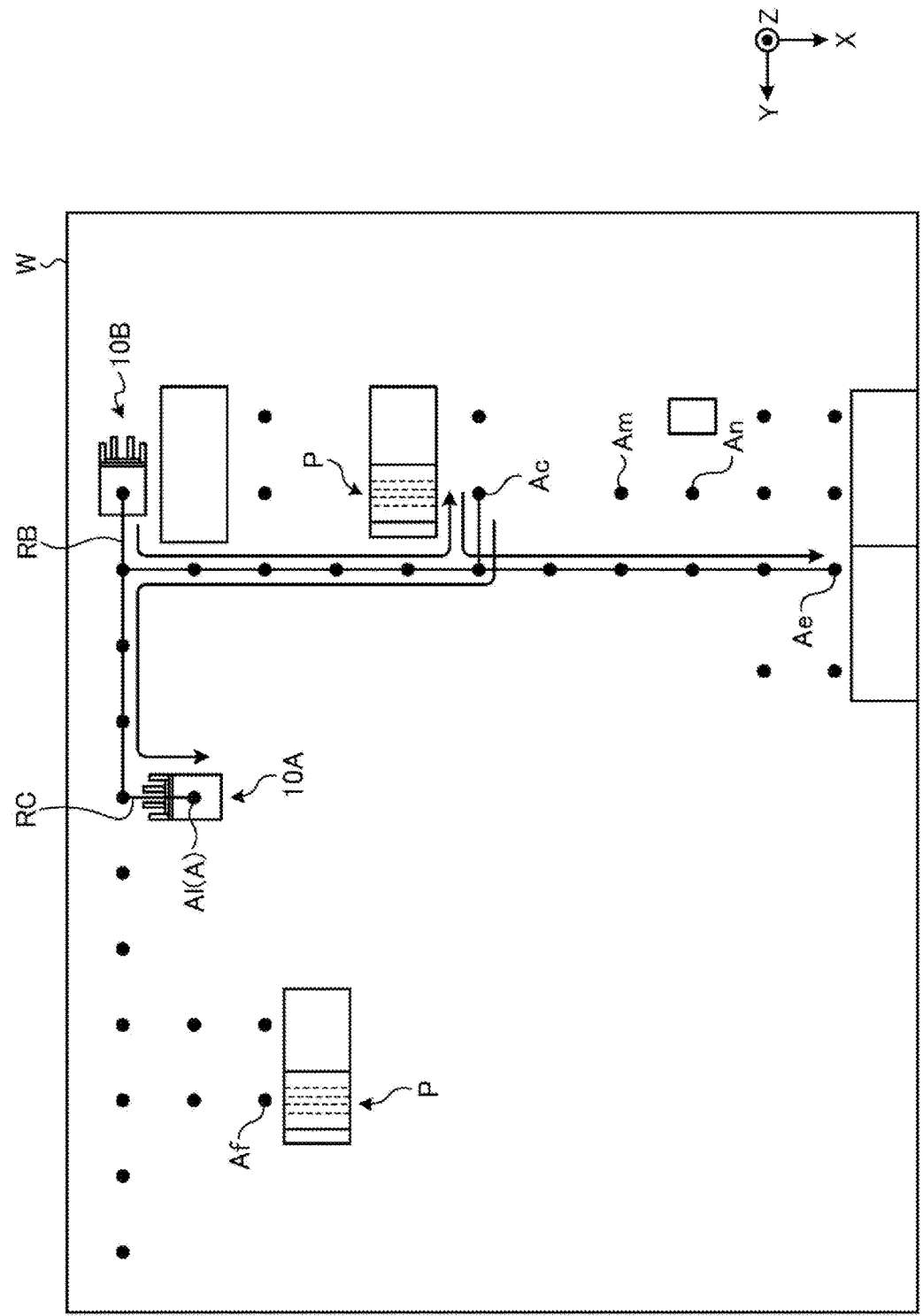
FIG. 10 is a schematic view illustrating another example of a standby position.

FIG. 10 is a schematic view illustrating another example of a standby position. When a next work is set for the first mobile body, the work setting unit 62 may set a candidate position close to the first position of the next work as a standby position. For example, the work setting unit 62 may set a standby position from among a plurality of candidate positions based on a positional relationship between a next departure position, which is a departure position (first position) of a route R of the first mobile body scheduled next to the first route, and the candidate positions. In that case, the work setting unit 62 may calculate a distance between the next departure position and each of the candidate positions, and set a standby position based on the distance for each candidate position. The work setting unit 62 may set a candidate position having the shortest distance to the next departure position as a standby position. In addition, for example, the work setting unit 62 may select, as a standby position, a candidate position located between the target position (second position) of the first route and the next departure position from among the plurality of candidate positions. For example, in FIG. 10, waypoints Am, An, and Al are set as the candidate positions, and a waypoint Af corresponds to the first position (next departure position) of a next route R following the route R of the mobile body 10A. In this case, among the waypoints Am, An, and Al, the waypoint Al has the shortest distance to the waypoint Af. Also, the waypoint Al is located between the waypoint Ac that is the second position of the route RA as the first route and the waypoint Af that is the first position of the next route. Accordingly, in the example of FIG. 10, the waypoint Al is selected as a standby position, and the route for standby position RC from the waypoint Ac to the waypoint Al is set. By setting the standby position near the departure position of the next work, the movement distance to the departure position after the start of the next work can be shortened.

Figure 11:
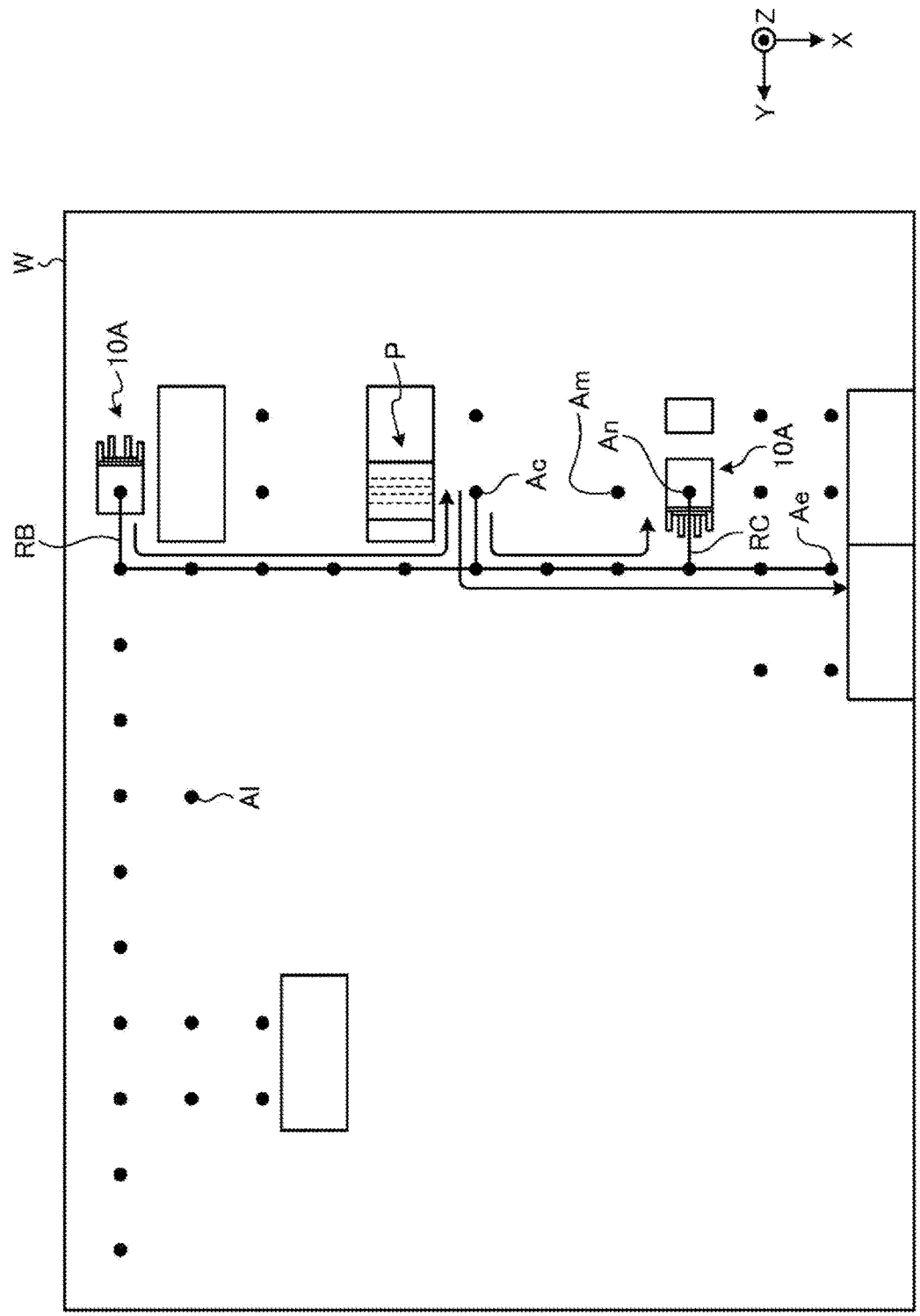
FIG. 11 is a schematic view illustrating another example of a standby position.

FIG. 11 is a schematic view illustrating another example of a standby position. Even in a case where no next work is set for the first mobile body, a candidate position close to an expected departure position, which is a departure position (first position) of a work expected to be assigned next, may be set as a standby position. The expected departure position may be set in advance based on a layout of the facility W. The work setting unit 62 may select a standby position from among a plurality of candidate positions based on a positional relationship between the expected departure position and the candidate positions. In that case, the work setting unit 62 calculate a distance between the expected departure position and each of the candidate positions, and set a standby position based on the distance for each candidate position. The work setting unit 62 may set a candidate position having the shortest distance to the expected departure position as a standby position. In addition, for example, the work setting unit 62 may select, as a standby position, a candidate position located between the target position (second position) of the first route and the expected departure position from among the plurality of candidate positions. For example, in the facility W of FIG. 11, the layout is designed such that the placement areas AR1 into which target objects P are carried are concentrated in the vicinity of a waypoint Ae. Thus, the work setting unit 62 sets the waypoint Ae as the expected departure position, and sets, as a standby position, a waypoint An having the shortest distance to the waypoint Ae among waypoints Am, An, and Al.

In addition, the processes of setting a standby position described above may be combined. That is, the work setting unit 62 may set a standby position based on at least one of the distances between the target position of the first route and the candidate positions, the expected arrival times from the target position of the first route to the candidate positions, the positional relationship between the next departure position and the candidate positions, and the positional relationship between the expected departure position and the candidate positions.

Processing Flow

Figure 12:
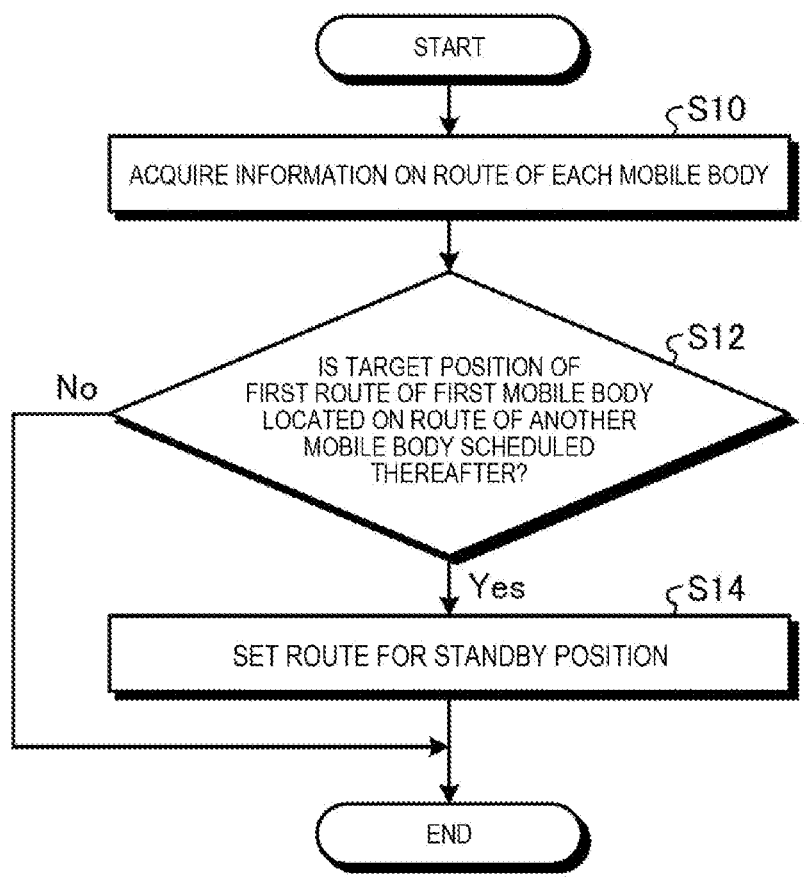
FIG. 12 is a flowchart illustrating a flow for setting a route for standby position.

Processing flow for setting a route for standby position described above will be described with reference to a flowchart. FIG. 12 is a flowchart illustrating a flow for setting a route for standby position. As illustrated in FIG. 12, the information processing device 14 causes the route information acquisition unit 64 to acquire information on the route R of each of the mobile bodies 10 (step S10), and causes the work setting unit 62 to determine whether the target position of the first route of the first mobile body for which a route for standby position is to be set is located on any of the routes of other mobile bodies 10 scheduled thereafter (step S12). When the target position of the first route is located on the route of another mobile body 10 (step S12; Yes), the work setting unit 62 sets a route for standby position for the first mobile body (step S14), and when the target position of the first route is not located on any of the routes of the other mobile bodies 10 (step S12; No), the work setting unit 62 does not set a route for standby position for the first mobile body. The information processing device 14 executes the above processing for each of set works, and ends the processing upon completion of the processing on all the works.

Effects

As described above, the information processing method according to the disclosure includes: a step of acquiring information on a first route being a travel route of a first mobile body for a first time period and information on a second route being a travel route of a second mobile body for a second time period after the first time period; and a step of setting a route for standby position as a travel route of the first mobile body for a third time period after the first time period and before the second time period when a target position of the first route is located on the second route, the route for standby position being a route from the target position to a standby position, the standby position being a position not overlapping with the second route. According to the disclosure, when the target position of the first mobile body overlaps with the second route of the second mobile body that moves later, the route for standby position to the standby position not overlapping with the second route is set so as to cause the first mobile body to move to the standby position. Accordingly, the deadlock can be suppressed.

In the step of setting a route for standby position, the standby position is selected from among candidate positions not overlapping with the second route. By selecting the standby position from a plurality of candidate positions set in advance, the route for standby position to the standby position not overlapping with the second route can be appropriately set, and the deadlock can be suppressed.

In the step of setting a route for standby position, the standby position is selected from among the plurality of candidate positions based on distances between the target position and the candidate positions. By selecting the standby position based on the distances between the target position and the candidate positions, for example, it is possible to cause the first mobile body to immediately move to the standby position.

In the step of setting a route for standby position, the standby position is selected from among the plurality of candidate positions based on a positional relationship between a departure position (next departure position) of a route R of the first mobile body scheduled next to the first route and the candidate positions. By selecting the standby position based on the positional relationship between the next departure position and the candidate positions, a next work can be appropriately executed while the deadlock is suppressed.

In the step of setting a route for standby position, when the route for standby position is set so that the first mobile body will not pass through sections through which mobile bodies 10 other than the first mobile body are scheduled to pass in time periods after the first time period at the same time as the other mobile bodies 10, the standby position is selected from among the plurality of candidate positions based on expected arrival times at the standby position. This makes it possible to cause the first mobile body to move to the standby position as quickly as possible without causing interference with the movements of the other mobile bodies 10.

The information processing method according to the disclosure further includes a step of causing the first mobile body to move along the route for standby position. According to the disclosure, the deadlock can be suppressed.

The embodiments of the disclosure have been described above, but the embodiment is not limited by the details of the embodiments above. Furthermore, the constituent elements of the above-described embodiments include elements that are able to be easily conceived by a person skilled in the art, and elements that are substantially the same, that is, elements of an equivalent scope. Furthermore, the constituent elements described above can be appropriately combined. Furthermore, it is possible to make various omissions, substitutions, and changes to the constituent elements within a range not departing from the scope of the above-described embodiments.

While preferred embodiments of the invention have been described as above, it is to be understood that variations and modifications will be apparent to those skilled in the art without departing from the scope and spirit of the invention. The scope of the invention, therefore, is to be determined solely by the following claims.

The invention claimed is:

1. An information processing method comprising:
    acquiring information on a first route being a travel route of a first mobile body during a first time period and information on a second route being a travel route of a second mobile body during a second time period after the first time period, and information on a next route to the first route of the first mobile body;
    setting a route for standby position as a travel route of the first mobile body during a third time period after the first time period and before the second time period when a target position of the first route is located on the second route, the route for standby position being a route from the target position to a standby position, the standby position being a position not overlapping with the second route; and
    causing the first mobile body to move along the travel route,
    when the target position of the first route is located on the second route, and the next route is set in a time period earlier than the second time period and has a target position at a position that does not overlap with the second route, the route for standby position is not set for the first mobile body, and when the target position of the first route is located on the second route, and the next route, that is set in a time period earlier than the second time period and has a target position at a position that does not overlap with the second route, is not set, the route for standby position is set for the first mobile body.

2. The information processing method according to claim 1, wherein, in the setting, the standby position is selected from among a plurality of candidate positions not overlapping with the second route.

3. The information processing method according to claim 2, wherein, in the setting, the standby position is selected from among the plurality of candidate positions based on a distance between the target position and each of the plurality of candidate positions.

4. The information processing method according to claim 2, wherein, in the setting, the standby position is selected from among the plurality of candidate positions based on a positional relationship between a departure position of a travel route of the first mobile body scheduled next to the first route and each of the plurality of candidate positions.

5. The information processing method according to claim 2, wherein, in the setting, the standby position is selected from among the plurality of candidate positions based on expected arrival time to the standby position when the route for standby position is set in such a manner that the first mobile body will not pass through a section where a different mobile body other than the first mobile body is scheduled to move after the first time period, during a time period identical to a time period of the different mobile body.

6. The information processing method according to claim 1, further comprising causing the first mobile body to move along the route for standby position.

7. An information processing device comprising:
    a route information acquisition unit configured to acquire information on a first route being a travel route of a first mobile body during a first time period and information on a second route being a travel route of a second mobile body during a second time period after the first time period, and information on a next route to the first route of the first mobile body;
    a work setting unit configured to set a route for standby position as a travel route of the first mobile body during a third time period after the first time period and before the second time period when a target position of the first route is located on the second route, the route for standby position being a route from the target position to a standby position, the standby position being a position not overlapping with the second route; and
    a movement control unit that causes the first mobile body to move along the travel route,
    when the target position of the first route is located on the second route, and the next route is set in a time period earlier than the second time period and has a target position at a position that does not overlap with the second route, the route for standby position is not set for the first mobile body, and when the target position of the first route is located on the second route, and the next route, that is set in a time period earlier than the second time period and has a target position at a position that does not overlap with the second route, is not set, the route for standby position is set for the first mobile body.

8. A non-transitory computer readable storage medium storing a program for causing a computer to execute:
    acquiring information on a first route being a travel route of a first mobile body during a first time period and information on a second route being a travel route of a second mobile body during a second time period after the first time period, and information on a next route to the first route of the first mobile body;
    setting a route for standby position as a travel route of the first mobile body during a third time period after the first time period and before the second time period when a target position of the first route is located on the second route, the route for standby position being a route from the target position to a standby position, the standby position being a position not overlapping with the second route; and
    causing the first mobile body to move along the travel route,
    when the target position of the first route is located on the second route, and the next route is set in a time period earlier than the second time period and has a target position at a position that does not overlap with the second route, the route for standby position is not set for the first mobile body, and when the target position of the first route is located on the second route, and the next route, that is set in a time period earlier than the second time period and has a target position at a position that does not overlap with the second route, is not set, the route for standby position is set for the first mobile body.

* * * * *